US012574685B2

(12) United States Patent
Zhao et al.

(10) Patent No.: US 12,574,685 B2
(45) Date of Patent: Mar. 10, 2026

(54) SOUND PRODUCING DEVICE

(71) Applicant: GOERTEK INC., Weifang (CN)

(72) Inventors: Guodong Zhao, Weifang (CN); Xiaoyi Zhou, Weifang (CN); Ruixiang Mu, Weifang (CN)

(73) Assignee: GOERTEK INC., Weifang (CN)

( * ) Notice: Subject to any disclaimer, the term of this patent is extended or adjusted under 35 U.S.C. 154(b) by 175 days.

(21) Appl. No.: 18/563,410

(22) PCT Filed: Jun. 30, 2022

(86) PCT No.: PCT/CN2022/102694
§ 371 (c)(1),
(2) Date: Nov. 22, 2023

(87) PCT Pub. No.: WO2023/274353
PCT Pub. Date: Jan. 5, 2023

(65) Prior Publication Data

US 2024/0223958 A1 Jul. 4, 2024

(30) Foreign Application Priority Data

Jun. 30, 2021 (CN) ......................... 202110746641.1

(51) Int. Cl.
*H04R 9/06* (2006.01)
*H04R 9/02* (2006.01)
*H04R 9/04* (2006.01)

(52) U.S. Cl.
CPC ............. *H04R 9/046* (2013.01); *H04R 9/025* (2013.01); *H04R 9/04* (2013.01); *H04R 9/045* (2013.01);
(Continued)

(58) Field of Classification Search
CPC .......... H04R 9/025; H04R 9/027; H04R 9/04; H04R 9/045; H04R 9/046; H04R 9/06; H04R 2209/024; H04R 2209/041
See application file for complete search history.

(56) References Cited

U.S. PATENT DOCUMENTS 4,295,011 A * 10/1981 Hathaway .............. H04R 9/025 181/167
2009/0067643 A1 3/2009 Ding
(Continued)

FOREIGN PATENT DOCUMENTS

CN 203708466 U * 7/2014
CN 205491124 U 8/2016
(Continued)

OTHER PUBLICATIONS

International Search Report from International Application No. PCT/CN2022/102694 mailed Sep. 28, 2022.

*Primary Examiner* — Huyen D Le
(74) *Attorney, Agent, or Firm* — Shih IP Law Group, PLLC

(57) ABSTRACT

Disclosed is a sound producing device, including a magnetic circuit system and a vibration system. The magnetic circuit system includes a primary magnet steel and a secondary magnet steel with a magnetic gap therebetween, wherein the secondary magnet steel includes a body portion and a protruding portion protruding in a direction toward the primary magnet steel from the body portion, and wherein the primary magnet steel has a primary magnetic conductive plate disposed thereon. The vibration system includes a diaphragm and an voice coil wound by wire, wherein the voice coil is inserted in the magnetic gap to drive the diaphragm to vibrate, and wherein a number of layers of wire winding at an end of the voice coil away from the
(Continued)

diaphragm are less than that of layers of wire winding at another end of the voice coil contacting with the diaphragm, to form a notch.

10 Claims, 6 Drawing Sheets

(52) U.S. Cl.
CPC .......... *H04R 9/06* (2013.01); *H04R 2209/024* (2013.01); *H04R 2209/041* (2013.01)

(56) References Cited

U.S. PATENT DOCUMENTS

| | | | | |
|---|---|---|---|---|
| 2011/0274308 | A1* | 11/2011 | Doh .......................... | H04R 9/06 381/398 |
| 2019/0238990 | A1* | 8/2019 | Zhong .................... | H04R 9/025 |

FOREIGN PATENT DOCUMENTS

| | | | |
|---|---|---|---|
| CN | 107770688 | A | 3/2018 |
| CN | 210868146 | U | 6/2020 |
| CN | 113507671 | A | 10/2021 |
| CN | 216982109 | U | 7/2022 |
| KR | 20060014662 | A | 2/2006 |

* cited by examiner

SOUND PRODUCING DEVICE

TECHNICAL FIELD

The present disclosure relates to a field of electroacoustic transducing, specifically, to a sound producing device.

DESCRIPTION OF RELATED ART

A sound producing device is an important component in electronic products, which converts digital signals into sound waves for playback. The sound producing device includes a vibration system and a magnetic circuit system including a magnetic gap therein. The vibration system includes a diaphragm, a voice coil inserted in the magnetic gap to drive the diaphragm to vibrate. In the sound producing device, the voice coil axially reciprocating in the magnetic gap. It is necessary to decrease distortion in the sound producing device for better sound quality, and at the same time, to increase the sensitivity of the sound producing device for higher volume levels. However, it is not achieved in the prior art to decrease distortion while increasing the sensitivity.

Therefore, it is necessary to provide a new sound producing device to solve these technical problems.

SUMMARY

A main purpose of the present disclosure is to provide a sound producing device and a sound producing device having the same, which can increase the sensitivity while decreasing distortion.

To this end, the sound producing device according to the present disclosure includes: a magnetic circuit system including a primary magnet steel and a secondary magnet steel with a magnetic gap therebetween, wherein the secondary magnet steel includes a body portion and a protruding portion protruding in a direction toward the primary magnet steel from the body portion, and wherein the primary magnet steel has a primary magnetic conductive plate disposed thereon; and a vibration system including a diaphragm and a voice coil wound by wire, wherein the voice coil is inserted in the magnetic gap to drive the diaphragm to vibrate, and wherein a number of layers of wire winding at an end of the voice coil away from the diaphragm is less than that of layers of wire winding at another end of the voice coil contacting with the diaphragm, to form a notch at a position corresponding to the protruding portion, so that the voice coil does not contacting with the secondary magnet steel when the diaphragm moves to an end position of vibration range.

Optionally, the voice coil includes a plurality of fully-wound coil layers and non-fully-wound coils disposed outside the plurality of fully-wound coil layers, wherein wires of the respective fully-wound coil layers and wires of the respective non-fully-wound coil layers are arranged in different planes parallel to a vibration direction of the voice coil, and wherein the number of turns of the wires of each of the non-fully-wound coil layers is less than that of the wires of each of the fully-wound coil layers.

Optionally, the number of turns of the wires of each of the non-fully-wound coils decrease successively in direction from the primary magnet steel to the secondary magnet steel and the notch is defined by an outermost fully-wound coil layer and end portions of the non-fully-wound coils away from the diaphragm.

Optionally, the secondary magnet steel includes a body portion and a protruding portion protruding in a direction toward the primary magnet steel from the body portion, and the magnetic circuit system further includes a secondary magnetic conductive plate disposed on the body portion and the protruding portion at a position corresponding to the notch.

Optionally, a step is provided at a position corresponding to a connection portion between the protruding portion of the voice coil at an end of the protruding portion close to the diaphragm and the body portion.

Optionally, the protruding portion includes a side surface close to the primary magnet steel and a first stop surface extending from an end of the side surface close to the diaphragm in a direction away from the primary magnet steel, the body portion includes a top surface coupled to the secondary magnetic conductive plate and a second stop surface extending from an end of the top surface close to the primary magnet steel in a direction away from the diaphragm, and the step is defined by the first stop surface and the second stop surface intersecting with each other.

Optionally, an outermost fully-wound coil layer is disposed to face the second stop surface, and an end portion of the non-fully-wound coils away from the diaphragm is disposed to face the first stop surface.

Optionally, a connection portion between an end of the protruding portion close to the diaphragm and the body portion has an outer chamfered shape.

Optionally, an end portion of the non-fully-wound coils away from the diaphragm forms an oblique surface corresponding to shape of outer chamfered shape.

Optionally, the sound producing device further includes a frame having an accommodating space accommodating the vibration system and the magnetic circuit system therein.

According to the technical solution of the present disclosure, by setting the number of layers of wire winding at an end of the voice coil away from the diaphragm to be less than that of layers of wire winding at another end of the voice coil contacting with the diaphragm, a number of turns in voice coil inserted in the magnetic gap is reduced, which smooths a BL curve, improves uniformity of magnetic field force acting on the voice coil in the magnetic field, and thus effectively solves distortion problem in the sound producing device. Meanwhile, by using a difference in the number of layers of wire winding, the voice coil has a notch for avoiding secondary magnet steel to provide more space to dispose the secondary magnet steel. By disposing protruding portion, magnetic gap is reduced to increase magnetic flux and BL value so as to improve product sensitivity. Furthermore, by disposing the notch, contacting between the voice coil and the secondary magnet steel during vibration of the voice coil is avoided.

BRIEF DESCRIPTION OF DRAWINGS

In order to illustrate the technical solutions in the embodiments of the present disclosure or the related art more clearly, a brief introduction will be given below on the drawings that need to be used in the description of the embodiments or the related art. Obviously, the drawings described below are only some embodiments of the present disclosure. For those skilled in the art, other drawings can also be obtained based on the structures shown in the drawings without creative work.

REFERENCE NUMERALS IN THE DRAWINGS

Figure 1:
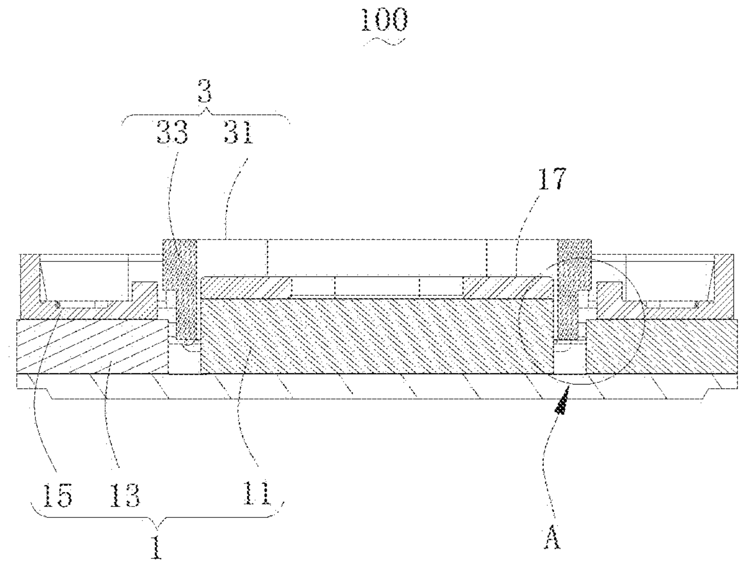
FIG. 1 is a schematic cross-sectional view of a sound producing device according an embodiment of the present disclosure.

100: Sound producing Device
1: Magnetic Circuit System
11: Primary Magnet steel
12: Magnetic Gap
13: Secondary Magnet steel
131: Body Portion
1311: Top Surface
1313: Second Stop surface
133: Protruding Portion
1331: Side Surface
1333: First Stop surface
135: Step
15: Secondary Magnetic conductive plate
3: Vibration System
31: Diaphragm
32: Notch
33: Voice Coil
331: Non-fully-wound Coils
333: Fully-wound Coils The purpose, functional characteristics and advantages of the present disclosure will be further explained in conjunction with embodiments with reference to the accompanying drawings.

DETAILED DESCRIPTIONS

Hereinafter, the technical solution according the embodiments will be described clearly and completely, with reference to the accompanying drawings. Obviously, the described embodiments are only a part of the embodiments of the present disclosure, not all of them. Based on the embodiments of the present disclosure, all other embodiments obtained by those skilled in the art without creative work are within the protection scope of the present disclosure.

It should be noted that all directional indications (such as up, down, left, right, front and back) in this embodiment are only used to explain relative positional relationships and motion states between components under a specific posture (as shown in the drawings). If this specific posture changes, these directional indications also change accordingly.

In addition, terms, such as "first" and "second", as used in this disclosure, are only for the purpose of illustration and cannot be understood as indicating or implying their relative importance or implying a certain number of technical features indicated. Therefore, features defined by "first" or "second" may include at least one feature either explicitly or implicitly. In describing various elements throughout this specification, the meaning of "various" is two or more than two, such as two, three etc., unless specifically limited otherwise.

In this disclosure, terms, such as, "connected", "fixed" and the like, should be broadly interpreted unless specifically stated or limited otherwise. For example, "fixed" can refer to "fixedly connected" or "detachably connected" or "integrally formed", can also refer to "mechanically connected" or "electrically connected", can also refer to "directly connected" or "indirectly connected via an intermediate medium", or can also refer to "internal communication between two components" or "interaction relationship between two components", unless specifically limited otherwise. Those skilled in the art can understand their specific meanings in the present disclosure according to the specific situations.

Furthermore, the technical among solutions various embodiments of the present disclosure can be combined with one another, but it must be based on what those skilled in art can achieve. When contradictions arise from combining different technical solutions together or they become unachievable, it shall be deemed that such combination does not exist, and it is not within the scope of protection of the present disclosure. It should be understood that the specific embodiments described herein are only used to explain the present disclosure and are not intended to limit the present disclosure.

Figure 2:
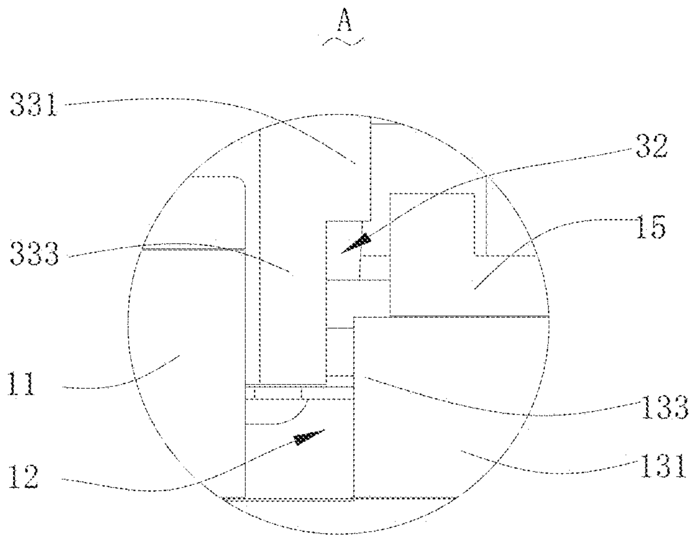
FIG. 2 is an enlarged structural schematic diagram of part A of the sound producing device as shown in FIG. 1.
Figure 3:
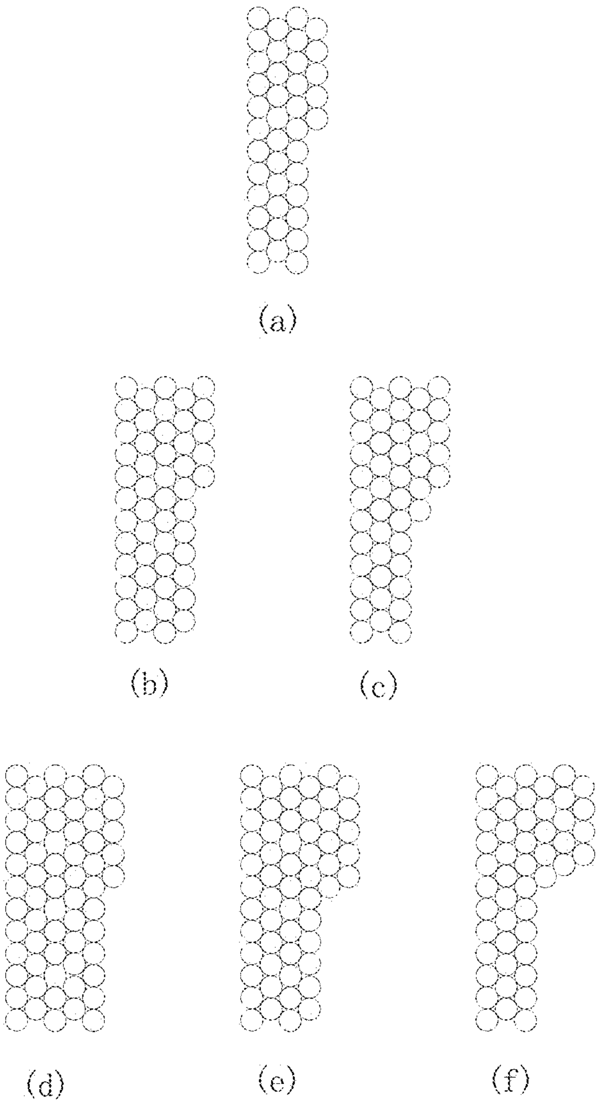
FIG. 3 is a schematic cross-sectional view of a voice coil according to various embodiments according to the present disclosure.

As shown in FIGS. 1, 2, and 3, the sound producing device 100 provided by the present disclosure includes a magnetic circuit system 1 and a vibration system 3. The magnetic circuit system 1 includes a primary magnet steel 11 and a secondary magnet steel 13 with a magnetic gap 12 formed therebetween. The vibration system 3 includes a diaphragm 31 and a voice coil 33 wound by wire. The voice coil 33 is inserted in the magnetic gap 12, to drive the diaphragm 31 to vibrate. The number of layers of wire winding of an end of the voice coil 33 away from the diaphragm 31 is less than that of an end of the voice coil 33 connected to the diaphragm 31, to form a notch 32 corresponding to the secondary magnet steel 13, so that the voice coil 33 does not contacting with the secondary magnet steel 13 when the diaphragm 31 moves to an end position of vibration range close to the secondary magnet steel 13.

An external circuit is connected with voice coil 33. When the voice coil 33 is energized, the voice coil 33 moves up and down within the magnetic gap 12 under magnetic field formed by magnetic circuit system 1, so as to drive diaphragm 31 to generate sound. The end position of vibration range refers to maximum movement positions of the voice coil 33 relative to the magnetic circuit system 1, i.e., the relative positions of the voice coil to the magnetic circuit system 1 when the diaphragm is pushed outwards to the maximum protruded position and pulled inwards to the maximum recessed position. The vibration range is a space in which the voice coil 33 moves up and down, i.e., a space of movement between the two maximum positions.

It should be understood by those skilled in this art that the voice coil 33 is formed by winding a conductive wire in a plurality turns. During the manufacture process, an inner layer is first wound followed by winding a second layer on outer surface of the wound inner layer and so forth. The specific number of layers of the wire winding from the inside to the outside is determined by those skilled in this art according to actual situations. During the winding process, the number of layers of wire of an end close to the diaphragm 31 may be controlled to be larger and that of an end away from the diaphragm 31 may be less, so that the end of the voice coil 33 close to the diaphragm 31 is substantially thicker than the end away from the diaphragm 31. This reduces the number of turns of voice coil 33 inserted in magnetic gap 12 and thus smooths of BL curve of sound producing device 100, enhances uniformity of magnetic field force acting on the voice coil 33 within magnetic field, and effectively solves distortion problem in the sound producing device 100. To illustrate a difference between secondary magnet steel 13 according to the present disclosure and that in the related art, body portion 131 can be the same size as the secondary magnet steel 13 in the related art while the protruding portion 133 is a portion additionally disposed due to presence of the notch 32 provided in the voice coil 33. Therefore, magnetic circuit system 1 provided by present disclosure has larger magnetic flux than that of magnetic circuit system 1 having the same size in the related art.

In the present disclosure, by setting a number of layers of wire winding at an end of the voice coil 33 away from the diaphragm 31 to be less than that of layers of wire winding at an end of the voice coil 33 contacting with the diaphragm 31, a number of turns in the voice coil 33 inserted in the magnetic gap 12 is reduced, which smooths of a BL curve of the sound producing device 100, improves uniformity of magnetic field force acting on the voice coil 33 in the magnetic field, and thus effectively solves distortion problem in the sound producing device 100. Meanwhile, by using a difference in the number of layers of wire winding, the voice coil has a notch 32 for avoiding secondary magnet steel 13 to provide more space to dispose the secondary magnet steel 13. By disposing protruding portion 133, magnetic gap 12 is reduced to increase magnetic flux and BL value so as to improve product sensitivity. Furthermore, by disposing the notch 32, contacting between the voice coil 33 and the secondary magnet steel 13 during vibration of the voice coil is avoided. The magnetic circuit system 1 further includes a primary magnetic conductive plate 17 disposed on the primary magnet steel 11 to optimize the magnetic circuit.

Figure 4:
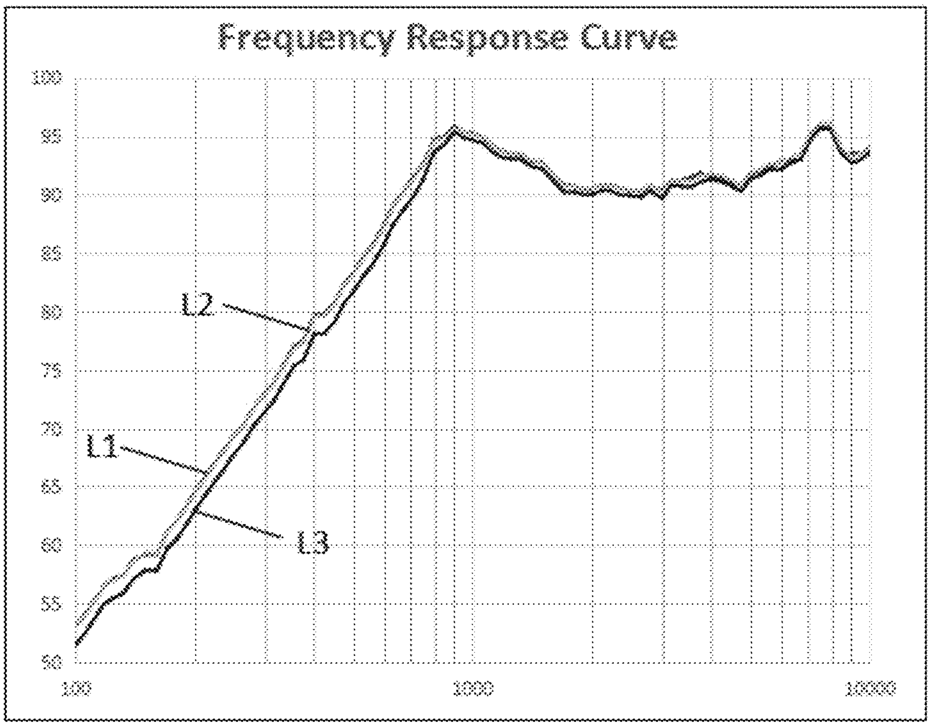
FIG. 4 is frequency response graphs of sound producing devices according the present disclosure and a comparative example.
Figure 5:
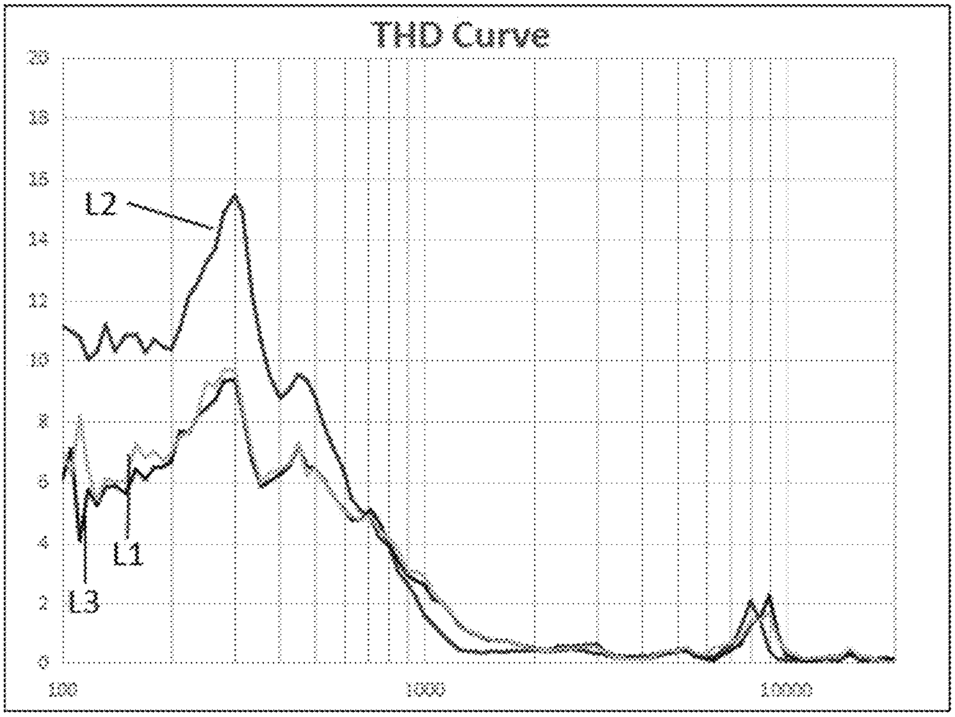
FIG. 5 is distortion graphs of sound producing devices according the present disclosure and a comparative example.

Referring to FIGS. 4 and 5, FIG. 4 is frequency response graphs of sound producing devices according the present disclosure and a comparative example and FIG. 5 is distortion graphs of sound producing devices according the present disclosure and a comparative example. In the figures, curve L1 is a curve corresponding to the sound producing device 100 provided by the present disclosure, curve L2 is a curve corresponding to a sound producing device 100 according to a comparative example 1, and curve L3 is a curve corresponding to a sound producing device 100 according to a comparative example 2. The difference between the three sound producing devices is that in the sound producing device 100 of the comparative example 1, the secondary magnetic steel 13 has not been increased in size according to the notch 32 and in the sound producing device 100 of the comparative example 2, the voice coil 33 has no notch disposed therein. As seen from FIG. 3, frequency responses of the sound producing device 100 corresponding to curves L1 and L3 are basically similar to each other and are significantly better than that of curve L2, especially in low-frequency section. As seen from FIG. 4, distortions of the sound producing device 100 corresponding to curves L1 and L3 are less than that of curve L2.

With reference back to FIGS. 1, 2 and 3, the voice coil 33 includes a plurality of fully-wound coil layers 333 and non-fully-wound coils 331 disposed outside the plurality of fully-wound coil layers 333. Here, wires of the respective fully-wound coil layers 333 and wires of the respective non-fully-wound coil layers 331 are arranged in different planes parallel to a vibration direction of the voice coil 33. Here, a number of turns of the wires of each of the non-fully-wound coil layers 331 is less than that of the wires of each of the fully-wound coil layers 333.

The number of turns of wires refers to the number of loops of the coil of each of the non-fully-wound coil layers 331 or the fully-wound coil layers 333. For example, as shown in FIG. 3 which depicts cross-sectional views for the voice coils 33 according to various embodiments where each circle represents a cross-sectional view of each wire, each column corresponds to one coil layer of the voice coil 33, and the number of circles arranged in each column equals to the number of turns of each wire. In FIG. 3*a*, the number of turns of wire of corresponding to the first layer is 12, the number of the fully-wound coil layers 333 is 3 and the number of the non-fully-wound coil layers 331 is 1. In the coil of FIG. 3*b*, the number of the fully-wound coil layers 333 is 4 and the number of the non-fully-wound coil layers 331 is 1. In the coil of FIG. 3*c*, the number of the fully-wound coil layers 333 is 3 and the number of the non-fully-wound coil layers 331 is 2. In the coil of FIG. 3*d*, the number of the fully-wound coil layers 333 is 5 and the number of the non-fully-wound coil layers 331 is 1. In the coil of FIG. 3*e*, the number of the fully-wound coil layers 333 is 4 and the number of the non-fully-wound coil layers 331 is 2. In the coil of FIG. 3*f*, the number of the fully-wound coil layers 333 is 3 and the number of the non-fully-wound coil layers 331 is 3. Those skilled in the art may set different numbers of the fully-wound coil layers 333 and the non-fully-wound coils 331 as needed, thereby obtaining notches 32 with different shapes.

Furthermore, a number of turns of the wires of each of the non-fully-wound coils 331 decrease successively in a direction from the primary magnet steel 11 to the secondary magnet steel 13 and the outermost fully-wound coil layer 333 and end portions of the non-fully-wound coils 331 away from the diaphragm 31 define the notch 32. By setting a number of turns of the wires of the non-fully-wound coils 331 to decrease successively, an outer surface that tapers in a direction from the primary magnet steel 11 to the secondary magnet steel 13 can be formed and likelihood of collision of the voice coil 33 with secondary magnetic steel 13 during large amplitude vibrations can be reduced.

Magnetic circuit system 1 further includes a secondary magnetic conductive plate 15 disposed on the body portion 131. In this embodiment, the secondary magnetic conductive plate 15 only covers on the body portion 131 such that space between the plane where the secondary magnetic conductive plate 15 is located and the protruding portion 133 may be reserved for movement of the voice coil 33.

Figure 6:
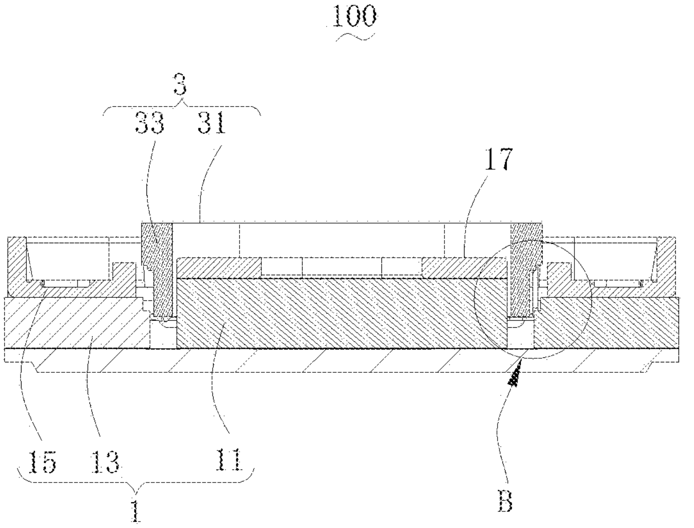
FIG. 6 is a schematic cross-sectional view of a sound producing device according another embodiment of the present disclosure.
Figure 7:
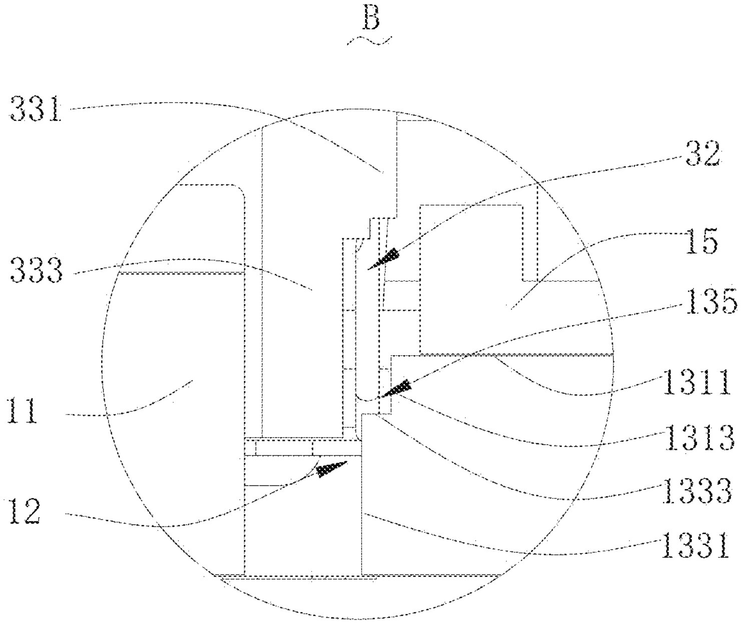
FIG. 7 is an enlarged structural schematic diagram of part B of the sound producing device as shown in FIG. 6.

Referring to FIGS. 6 and 7, a step 135 is provided at position corresponding to a connection portion between an end of the protruding portion 133 close to the diaphragm 31, and the step 135 matches with the notch 32 of the voice coil 33. By providing the step 135 corresponding to the notch 32, interference between the voice coil 33 and the protruding portion 133 can be avoided while ensuring the amplitude of the voice coil 33.

Specifically, the protruding portion 133 includes a side surface 1331 close to the primary magnet steel 11 and a first stop surface 1333 extending from an end of the side surface 1331 close to the diaphragm 31 in a direction away from the primary magnet steel 11, the body portion 131 includes a top surface 1311 coupled to the secondary magnetic conductive plate 13 and a second stop surface 1313 extending from an end of the top surface 1311 close to the secondary magnet steel 13 in a direction away from the diaphragm 31, and the first stop surface 1333 and the second stop surface 1313 intersecting with each other form the step 135, i.e., the step 135 is defined by the first stop surface 1333 and the second stop surface 1313. In other words, although only one step is provided as the step in this embodiment, a plurality of steps having different widths or heights may be provided as needed as long as the shapes of the respective steps 135 are compatible with the shapes of the respective notches 32 so that the voice coil 33 does not contact the secondary magnet steel 13 when the voice coil 33 moves to the maximum amplitude position, while keeping the size of the voice coil 33 as large as possible.

It should be understood by those skilled in art that when only one step is provided as the step 135, the corresponding notch 32 is provided as one step structure. In other words, the outermost the fully-wound coil layers 333 is disposed to face the second stop surface 1313 and an end portion of the non-fully-wound coils 331 away from the diaphragm 31 is disposed to face the first stop surface 1333. In the embodiment of FIG. 7, the top surface 1311 and the second stop surface 1313 may further form one step structure on which the secondary magnetic conductive plate 15 is not disposed and end portions of the non-fully-wound coils 331 away from the diaphragm 31 may be disposed to face the first stop surface 1333 and the top surface 1311, respectively, in the voice coil 33.

Figure 8:
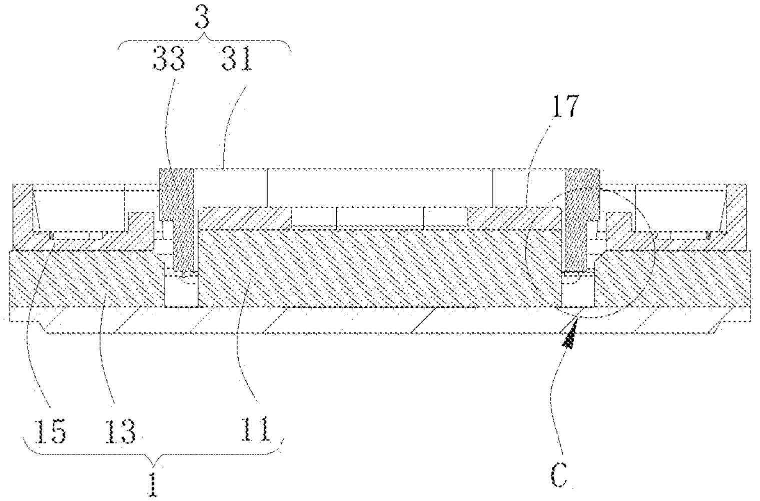
FIG. 8 is a schematic cross-sectional view of a sound producing device according a yet another embodiment of the present disclosure.
Figure 9:
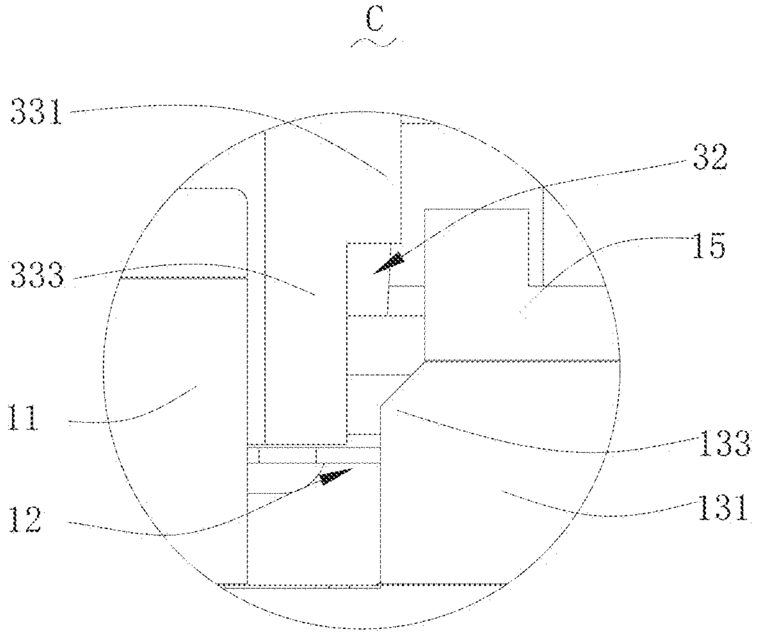
FIG. 9 is an enlarged structural schematic diagram of part C of the sound producing device as shown in FIG. 8.

Referring to FIGS. 8 and 9, in another embodiment, a connection portion between an end of the protruding portion 133 close to the diaphragm 31 and the body portion 131 has an outer chamfered shape. In other words, in this embodiment, an end of the protruding portion 133 close to the diaphragm 31 has an oblique surface structure, so that a distance between a surface of the protruding portion 133 close to the primary magnet steel 11 and the primary magnet steel 111 decrease successively along the direction from the secondary magnet steel 13 toward the diaphragm 31. Accordingly, an end portion of the non-fully-wound coils away from the diaphragm may form an oblique surface corresponding to shape of outer chamfered shape, thereby achieving the shape matching between the notch 32 and the protruding portion 133.

Furthermore, the sound producing device 100 further includes a frame having an accommodating space accommodating the vibration system 3 and the magnetic circuit system 1 therein. The sound producing device 100 may further be provided with a bottom plate combining with the frame to form the accommodating space. Here, each of the primary magnet steel 11 and secondary magnet steel 13 is attached to the bottom plate and the diaphragm 31 is fixed on the frame. When setting the vibration direction of the voice coil 33 as a height direction, the height of the primary magnet steel 11 may be higher than that of the secondary magnet steel 13 and the height of the primary magnetic conductive plate may be lower than that of the secondary magnetic conductive plate 15 in order to compensate for difference between stacked height of the primary magnet steel 11 and the primary magnetic conductive plate and that of the secondary magnet steel 13 and the secondary magnetic conductive plate 15 due to height of primary magnet steel 11 being higher than that of the secondary magnet steel 13.

The above description only represents preferred embodiments of the present disclosure and does not limit scope of patent protection thereof. Any equivalent structural or process transformation made based on contents disclosed in specification or drawings, or any direct or indirect application thereof in other related technical fields shall be included within scope of patent protection.

What is claimed is:

1. A sound producing device comprising:

a magnetic circuit system comprising a primary magnet steel and a secondary magnet steel with a magnetic gap therebetween, wherein the secondary magnet steel comprises a body portion and a protruding portion protruding in a direction toward the primary magnet steel from the body portion, and wherein the primary magnet steel has a primary magnetic conductive plate disposed thereon; and a vibration system comprising a diaphragm and a voice coil wound by wire, wherein the voice coil is inserted in the magnetic gap to drive the diaphragm to vibrate, and wherein a number of layers of wire winding at an end of the voice coil away from the diaphragm is less than that of wire winding at another end of the voice coil contacting with the diaphragm, to form a notch at a position corresponding to the protruding portion, so that the voice coil does not contact with the secondary magnet steel when the diaphragm moves to an end position of vibration range close to the secondary magnet steel.

2. The sound producing device according to claim 1, wherein the voice coil further comprises a plurality of fully-wound coil layers and non-fully-wound coils disposed outside the plurality of fully-wound coil layers, wherein wires of the respective fully-wound coil layers and wires of the respective non-fully-wound coil layers are arranged in different planes parallel to a vibration direction of the voice coil, and wherein a number of turns of the wires of each of the non-fully-wound coil layers is less than that of the wires of each of the fully-wound coil layers.

3. The sound producing device according to claim 2, wherein the number of turns of the wires of each of the non-fully-wound coils decrease successively in a direction from the primary magnet steel to the secondary magnet steel, and wherein the notch is defined by an outermost fully-wound coil layer and end portions of the non-fully-wound coils away from the diaphragm.

4. The sound producing device according to claim 2, wherein a step is provided at a position corresponding to a connection portion between an end of the protruding portion close to the diaphragm and the body portion, and the step matches with the notch of the voice coil.

5. The sound producing device according to claim 4, wherein the protruding portion comprises a side surface close to the primary magnet steel and a first stop surface extending from an end of the side surface close to the diaphragm in a direction away from the primary magnet steel, wherein the body portion comprises a top surface coupled to the secondary magnetic conductive plate and a second stop surface extending from an end of the top surface close to the primary magnet steel in a direction away from the diaphragm, and wherein the step is defined by the first stop surface and the second stop surface intersecting with each other.

6. The sound producing device according to claim 5, wherein an outermost fully-wound coil layer is disposed to face the second stop surface, and an end portion of the non-fully-wound coils away from the diaphragm is disposed to face the first stop surface.

7. The sound producing device according to claim 2, wherein a connection portion between an end of the protruding portion close to the diaphragm and the body portion has an outer chamfered shape.

8. The sound producing device according to claim 7, wherein an end portion of the non-fully-wound coils away from the diaphragm forms an oblique surface corresponding to shape of outer chamfered shape.

9. The sound producing device according to claim 1, wherein the magnetic circuit system further comprising a secondary magnetic conductive plate disposed on the body portion.

10. The sound producing device according to claim 1, further comprising a frame having an accommodating space accommodating the vibration system and the magnetic circuit system therein.

* * * * *